Patented June 17, 1930

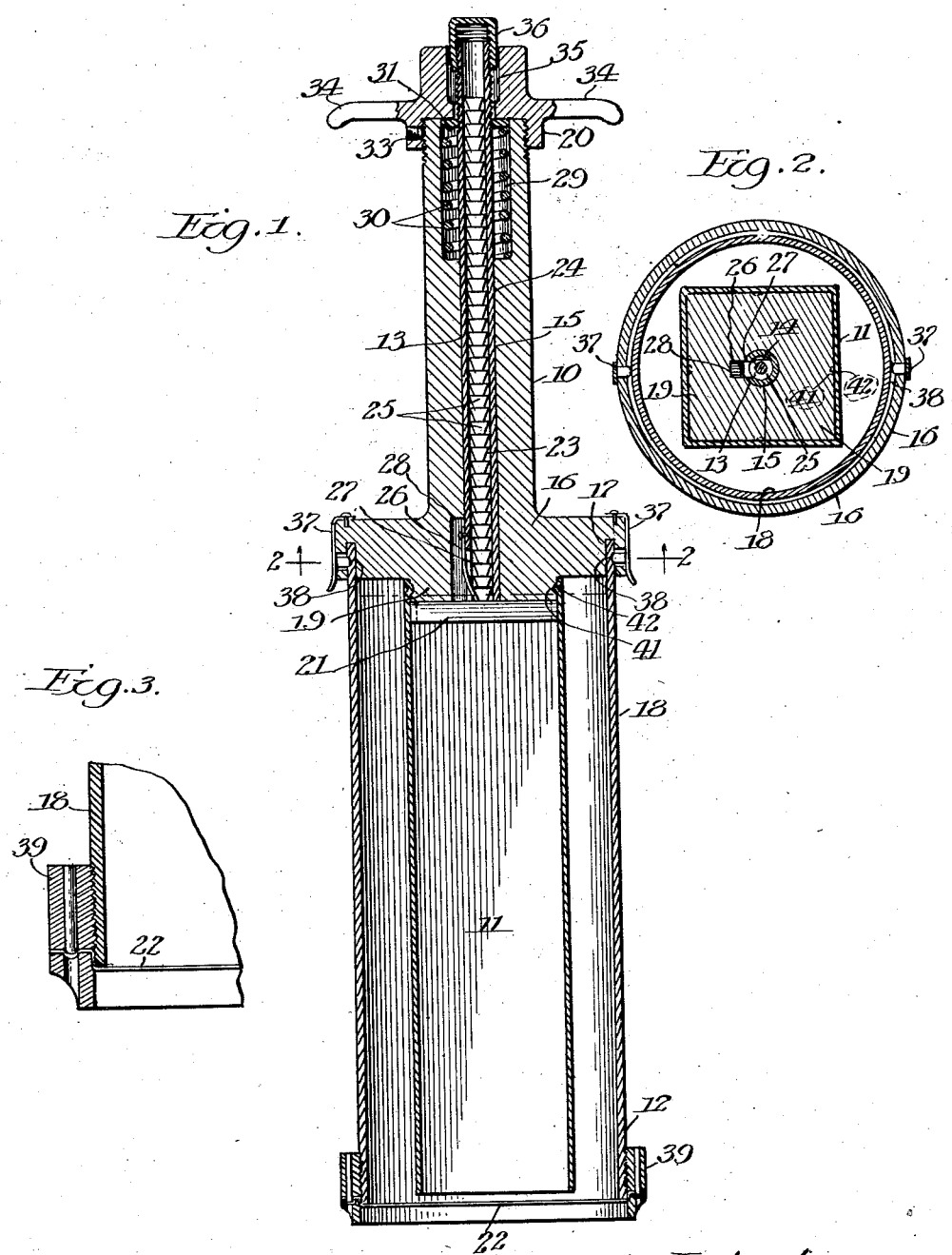

1,764,728

UNITED STATES PATENT OFFICE

THOMAS KASKOURAS, OF CHICAGO, ILLINOIS

DISPENSING DEVICE

Application filed November 5, 1928. Serial No. 317,157.

The invention relates to a dispensing device, and particularly to a device of the character which is capable of operation to dispense butter in small portions or patties, such as are now served to patrons in restaurants, hotels and other eating places.

The invention has as its principal object the production of a simple construction, which may, if so desired, be carried about and be operated to serve a patron directly from the device, which will thus eliminate the necessity of cutting a large quantity of butter and keeping it on hand and in condition ready to be served.

The invention has, therefore, among its various objects the provision of a device having a butter container, means for feeding the butter through the container, and a severing device for severing small portions of butter from that in the container, the various elements being associated with each other so that upon rotation of either the container or the severing device, the cutting or severing of the butter is effected.

It is a further object of the invention to provide the device with a handle having means for feeding the butter through the container, and in which the container is carried by a part of the handle, the part forming the handle also having the severing device connected therewith for rotation with respect thereto, so that upon rotation of either the handle or the severing device, the butter will have a portion thereof severed from the whole.

It is an additional object to provide a device of this character with means whereby the thickness of the severed portions may be varied in accordance with the desires of the proprietor or the patron, and to also design the parts so that one butter container may be readily disassociated from the device and have another substituted therefor, or to separate these portions to maintain the parts in a clean and sanitary condition, and to also permit one part, such as for instance the severing device per se to be changed should a portion thereof become broken or otherwise be rendered inoperative.

The structure, whereby the various features of the invention are accomplished, will be explained in detail, and more readily understood when read in conjunction with the accompanying drawings which illustrate one embodiment of the invention, it being obvious that changes and modifications may be resorted to without departing from the spirit of the appended claims forming a part hereof.

In the drawings, Fig. 1 is a central longitudinal section of a device constructed according to one embodiment of the invention;

Fig. 2 is a section taken on the line 2—2 of Fig. 1; and

Fig. 3 is an enlarged sectional view of a fragment of the means for attaching and maintaining the severing wire in a taut condition.

The invention contemplates the provision of a member 10, which forms a handle, the butter container 11, the severing device, generally designated 12 and a means generally designated 13, for feeding the butter through the container. The container 11 is detachably secured for rotation with the handle. The severing device is also detachably and rotatably secured to the part forming the handle, so that upon rotation of either the handle or the severing means, or rotation of both the handle and the severing means in opposite directions, the severance of a piece of butter from the whole is effected. The handle 10 is provided with a central bore 15, for the reception of the feeding device, generally designated 13, and is further constructed to provide the enlargement or head 16, having the annular recess 17, in which the tube 18 of the severing device, generally designated 12, is rotatably mounted. The head 16 is further provided with the square shoulder 19, to which the tubular butter container is connected for rotation with said head or handle. The handle 10 is further provided with a part 20, which forms a means which may be grasped to facilitate holding of the device and rotation of the handle and severing device relatively to each other. The handle 10 is designed to have the feeding device 13 located therein and also provides a means for housing a means for actuating the feeding device.

The feeding device, generally designated 13, includes the head 21, which is operable along the container 11 to force the butter through the lower end of the container and past the cutting wire 22 of the severing device. A stem 23 extends from the head 21 into the tubular member 24 of the feed actuator, and said stem is provided with a series of notches, which are designed to be engaged by the spring finger 26, which is secured to the tubular portion 24 of the actuator to drive the head 21 downwardly of the container. The finger 26 is secured to the tubular member 24 of the actuator and projects through an opening 27 into engagement with said notches. The part forming the handle is provided with a groove 28, in which said finger 26 is operable. The bore of the handle is enlarged, as indicated at 29, for the reception of a coiled spring 30, which reacts between a termination of the enlarged bore and the collar 31, the latter being threaded upon the tubular member 24, and is provided to assist the spring 30 in restoring the tubular member 24 after its depression, which depression causes the actuation of the feeding device. The cap member 20 is threaded upon the upper end of the portion forming the handle, it being held against accidental rotation relatively to the handle by means of the set screw 33. This cap is provided with the finger pieces 34, and is further provided with the recess 35, the latter of which is provided for the reception of the cap 36, which is threaded upon the end of the tubular member 24, and is adjustable relatively thereto and relatively to the bottom of the recess 35 to permit adjustments to be made to produce slices or pieces of butter of the desired thickness.

It is manifest that the distance between the termination of the recess 35 and the adjacent end of the cap 36 determines the extent of travel of the tubular member 24, which carries the spring finger 26, and thus determines the amount of travel of the head 21 and its associated elements upon each depression of the tubular member 24. The severing device, generally designated 12, is as before stated connected for rotation relatively to the handle and may be held in associated relation thereto by any suitable means, which will allow the severing device as a whole to be disassociated from the head of the handle. The means illustrated for accomplishing this end includes a plurality of spring clips 37, which are secured to the head 16 and enter the annular recess 38 provided in an end of the tubular portion 18 of the severing device, generally designated 12. It is manifest that this last mentioned construction will allow relative rotation of the severing means and the handle, and will also permit these portions to be readily disassembled to facilitate replacement of a container 11, or cleansing of the device. The lower end of the tubular element 18 of the severing device is provided with the cutting or severing means, generally designated 12, which in the present construction includes a collar 39, which is threaded upon the end of the tubular member and a cutting wire 22, which is located in the path of the butter as it is ejected from the butter container 11. The butter container 11 is provided with a plurality of projections 41, which extend inwardly of the container and are designed to enter depressions 42 in the squared shoulder 19 of the head to provide means for removably attaching the container to this portion of the head.

From the foregoing description, it is manifest that by applying pressure to the end of the tubular member 24, that said member will be depressed by the application of said pressure and will be restored by the coiled spring 30, and that upon depression thereof, the spring finger of the tubular member will engage one of the notches 25 and drive the head 21 longitudinally of the butter container and force the butter from the lower end of the container past the cutting wire 22.

It is also manifest that the projected piece of butter may be severed from the remainder of the butter in the container by either holding the tube 18 of the severing device against rotation and rotating the butter container by means of the handle, or reversing this operation, that is, holding the handle, and thus the butter container, stationary and rotating the tube 18, and that this same result and operation may be accomplished by a partial rotation of both the handle and the severing device.

The stem 23 of the feeding device has one side thereof cut away along its length, as indicated at 14, to allow the stem to be arranged with the flat face against the spring finger 26 to thus allow the stem to be inserted and moved into the tube 24 without hindrance by said spring finger. It is evident that upon rotation of the stem, the flat face 14 and the spring finger will be moved out of the relation just described and into a relation in which the spring finger engages with the notches to thus arrange these parts so that the stem and its associated elements will be driven through the container upon operation of the tubular member 24.

The severing device 12 consists of the collar 39 and the severing wire 22, the latter of which is pinned to the collar. The cutting or severing wire engages with the edge of the tube 18, and thus as the collar is threaded upon the tube, the wire 22, by virtue of its engagement with the end of the tube is made taut and may thus be kept under proper tension to cause its proper operation.

It is also evident from the foregoing description of the construction that the various elements entering into the construction, such as the severing device, tubular member with which the severing device is associated, the butter container 11, and the feeding device, may all be readily associated and disassociated from each other to facilitate cleansing, and that certain of said elements, such as the butter container and the tubular member 18, may be disassociated from each other to facilitate recharging of the device when this is found necessary.

It is manifest that the collar, to which the cutting or severing wire is attached, may be readily detached from the tubular element 18, and also that as the collar is threaded upon the tube 18, the slack in the cutting or severing wire may be readily taken up and thus maintain the wire in a taut condition.

Having described the invention what I claim and desire to cover by Letters Patent is:

1. In a device of the class described, the combination of a member providing a handle, a container and a severing device connected to said member, a feeding device for feeding the commodity through said container, a rotatable connection provided between said handle and the severing device, said connection providing means whereby said handle and severing device may be rotated with respect to each other.

2. In a device of the class described, the combination of a member providing a handle, a container and a severing device connected to said member, a feeding device for feeding the commodity through said container, means for varying the operation of said feeding device, and a connection provided between said handle and the severing device, said connection providing means whereby said handle and severing device may be rotated with respect to each other.

3. In a device of the class described, the combination of a member providing a handle, a container and a severing device connected to said member, a feeding device for feeding a commodity through said container, said feeding device including a reciprocable member and means operated thereby for engaging and feeding the commodity through said container, a connection provided between said handle and severing device, said connection providing means whereby said handle and severing device may be rotated with respect to each other.

4. In a device of the class described, the combination of a member having a container and a severing device connected therewith, a feeding device arranged in said member for feeding a commodity through said container, and a rotatable connection between said member and container providing means providing for rotation of said member and severing device relatively to each other.

5. In a device of the class described, the combination of a member having a feeding device, a container connected to one end of said member, severing means connected to said end of said member, and a connection between said member and severing means providing means whereby one may be rotated with respect to the other.

6. In a device of the class described, the combination of a member having a container and a severing device connected with one end thereof, a feeding device arranged for movement in said member, said feeding device having a portion thereof extended beyond the opposite end of said member whereby said feeding device may be operated, a connection between said severing device and member, said connection providing means accomplishing rotation of said member and severing device.

7. In a device of the class described, the combination of a member having a container secured to and projecting from one end thereof, a severing device connected with said end of said member, said container being located within said severing device, a feeding device carried by said member for feeding a commodity through said container, a connection between said member and severing device, said connection providing means whereby said container and severing device may be rotated with respect to each other to sever said commodity, and said connection providing means whereby said severing device may be separably connected with said member.

8. In a device of the class described, the combination of a member having a container separably secured to and projecting from one end thereof, a severing device separably connected with said end of said member, said container being located within said severing device, a feeding device carried by said member for feeding a commodity through said container, a connection between said member and severing device, said connection providing means whereby said container and severing device may be rotated with respect to each other to sever said commodity.

9. In a device of the character described, the combination of a member having a container secured to and projecting from one end thereof, an element extending from said end of said member within which said container is located, a severing device extending across said element and across the end of the container, means for feeding the commodity through said container, said means including a member carried by said first mentioned member, and a connection between said first mentioned member and element whereby said first mentioned member and element may be rotated relatively to each other to cause the commodity to be severed.

10. In a device of the class described, the combination of a member providing a handle, a container separably secured to said handle, an element having a severing device, means for separably and rotatably securing said element of the severing device to said handle, said handle, container and element being arranged for relative rotation about a common axis, and a yieldably mounted reciprocable commodity feeding device mounted for movement axially of said handle.

11. In a device of the class described, the combination of a member providing a handle, a container separably secured to said handle, an element having a severing device, means for separably and rotatably securing said element of the severing device to said handle, said handle, container and element being arranged for relative rotation about a common axis, and a yieldably mounted reciprocable commodity feeding device mounted for movement axially of said handle, said feeding device having means for varying said movement thereof in one direction.

12. In a device of the class described, the combination of a member providing a handle, a rectangular container separably secured to said handle, a cylindrical element in which said rectangular container is arranged, said cylindrical element being provided with severing means, means for separably and rotatably connecting said cylindrical element to said handle, said handle and container being rotatable relatively to the cylindrical element, and a feeding device reciprocable along the axis of said handle, and means for regulating the movement of said feeding device.

In witness whereof, I hereunto subscribe my name this 26th day of October, A. D., 1928.

THOMAS KASKOURAS.